Patented Oct. 13, 1953

2,655,541

UNITED STATES PATENT OFFICE 2,655,541

PREPARATION OF CHOLINE CHLORIDE

Heinrich Hopff, Ludwigshafen (Rhine), and Karl Vierling, am Muehlrain, Neckargemuend, Germany No Drawing. Application October 13, 1949, Serial No. 121,222. In Germany October 14, 1948

2 Claims. (Cl. 260—567.6)

This invention relates to a new and simple process of producing useful quarternary ammonium compounds. It relates in particular to the production of β-oxyalkyl-trialkyl-ammonium salts, such as choline chloride.

The process hitherto in use in making β-oxyalkyltrialkylammonium salts consists in heating a mixture of substantially equivalent parts of an alkylene-α.β-halogenhydrine and a trialkylamine in a closed vessel. This process, however, has the drawback that undesirable side reactions are caused in many cases through sudden rises of the reaction temperature.

We have now found, and this is the object of our invention, that β-oxyalkyl-trialkyl-ammonium salts may be prepared in a far more simple and efficient manner and without troublesome side-reactions, by passing gaseous trialkylamines at elevated temperatures into β-hydroxyalkyl esters of strong acids, in particular of hydrogen halides, of sulfuric acids or the acid reacting derivatives of sulfuric acid, e. g. sulfonic acids or sulfuric acid mono-esters. Such esters are, for example, the α.β-halogen-hydrines, such as ethylenechlorohydrine, ethylenefluorohydrine or the β-hydroxyalkyl esters of sulfonic acids, such as p-toluene sulfonic acid β-oxyethyl ester or sulfuric acid β-hydroxy ethyl ester.

Suitable trialkylamines are, for example, trimethyl, triethyl, dimethylethyl and diethylmethyl amine, and suitable tertiary amines are, for example, N-methyl-pyrrolidine, -morpholine and -piperidine and their homologues. Diluants, such as alcohols or hydrocarbons may be used as reaction medium. The suitable reaction temperature depends on the reaction participants. Generally speaking, temperatures between 50° and 120° C. are the most suitable. The process is particularly useful in the production of the salts of choline, i. e. β-hydroxyethyl trimethyl ammonium hydroxide which is commercially useful owing to its known physiological properties.

The following example serves to illustrate the nature of our invention and how the same is to be carried out in practice, but it is understood that the invention is not limited to this example.

Example

Trimethylamine is introduced into a stirring vessel, heated to 80° C. and charged with ethylenechlorohydrine. The non-absorbed portions of the trimethylamine are passed into a second stirring vessel and completely absorbed therein by another charge of ethylenechlorohydrine. Introduction of trimethylamine is discontinued when there is no further absorption in the first vessel. By cooling the reaction mixture, choline chloride separates out; it is filtered off by suction. The filtrate is returned to the first vessel and its initial volume restored by a fresh supply of ethylenechlorohydrine. Trimethylamine is now led into the second vessel, while the non-absorbed portion of trimethylamine is passed into and absorbed by the charge of the first vessel. The absorption in the second vessel being complete, the procedure is again reversed, i. e. the filtrate is replenished with fresh ethylenechlorohydrine and treated again with trimethylamine so that the reaction vessels are used alternatively. Instead of stirring vessels there may also be employed high cylindrical vessels or towers.

What we claim is:

1. A process of producing choline chloride which comprises introducing gaseous trimethylamine at ordinary pressure into a vessel heated to about 80° C. and charged with ethylene chlorohydrine, passing the non-absorbed portions of the trimethylamine into a second vessel charged with ethylene chlorohydrine heated to about 80° C., discontinuing the introduction of trimethyl amine when there is no further absorption in the first vessel, cooling the reaction mixture, filtering off the choline chloride separated, returning the filtrate to the first vessel, restoring its initial volume by a fresh supply of ethylene chlorohydrine, introducing new gaseous trimethyl amine into the second vessel, the non-absorbed portions of the trimethylamine being passed into the first vessel, and analogously continuing the process using both vessels alternatively.

2. An improved process for the production of choline chloride which consists in passing gaseous trimethyl amine into ethylene chlorohydrine at ordinary pressure and at temperatures between 50° C. and 120° C.

HEINRICH HOPFF.
KARL VIERLING.

References Cited in the file of this patent

UNITED STATES PATENTS

| Number | Name | Date |
|---|---|---|
| 2,087,506 | De Groote | July 20, 1937 |
| 2,129,264 | Downing et al. | Sept. 6, 1938 |
| 2,135,521 | Major et al. | Nov. 8, 1938 |

FOREIGN PATENTS

| Number | Country | Date |
|---|---|---|
| 484,906 | Great Britain | May 9, 1938 |

OTHER REFERENCES

Renshaw, "J. Am. Chem. Soc.," vol. 32 (1910), pp. 128 to 130.

Beilstein "Organische Chemie," vol. III-IV. Second Supplement (1942), p. 721.